United States Patent [19]

Simms

[11] Patent Number: 4,960,988

[45] Date of Patent: Oct. 2, 1990

[54] SAFETY SHUT-OFF PROTECTION SYSTEM

[75] Inventor: Robert A. Simms, Phoenix, Ariz.

[73] Assignee: Murasa International, Long Beach, Calif.

[21] Appl. No.: 318,834

[22] Filed: Mar. 6, 1989

[51] Int. Cl.$^5$ ............................................. H01J 31/50
[52] U.S. Cl. ...................... 250/213 VT; 250/214 AL; 315/158
[58] Field of Search ................. 250/213 VT, 214 AL; 313/523, 525; 315/158, 159

[56] References Cited

U.S. PATENT DOCUMENTS

| | | | |
|---|---|---|---|
| 4,755,725 | 7/1988 | Kastendieck et al. | 250/213 VT |
| 4,853,529 | 8/1989 | Meyers | 250/213 VT |
| 4,876,444 | 10/1989 | Field | 250/214 AL |

Primary Examiner—David C. Nelms
Attorney, Agent, or Firm—LaValle D. Ptak

[57] ABSTRACT

A safety shut-off protection system is provided for a light responsive system such as video cameras, image intensifiers, thermal imagers, or the like. The light responsive system further includes several series-connected, normally-closed, light responsive photoelectric Darlington safety switches. These safety switches are located to receive light along with the light responsive systems. Light exceeding a threshold intensity impinging on any one of the Darlington safety switches causes such a switch to operate to deactivate the light sensitive system.

22 Claims, 1 Drawing Sheet

SAFETY SHUT-OFF PROTECTION SYSTEM

BACKGROUND

Electronic-optical imaging and detection systems are increasingly used in a variety of different applications. Such systems include infrared image intensifiers which are used to enhance night vision capabilities in extreme low light conditions. Such intensifiers are employed in conjunction with binoculars, night vision goggles, and in other applications. Electronic multiplex video cameras also utilize light sensitive components which react to the intensity of the light directed toward the camera for controlling the camera lens opening. Similar circuits also are provided for "automatic" 35MM cameras.

Sensitive thermal imagers currently being developed may be used in some applications in a manner similar to image intensifiers for providing a visual output based on a thermal pattern. Devices of this type may be substituted for or may be used in conjunction with infrared imager intensifiers for improved night vision applications.

Image intensifiers, electronic multiplex cameras, and thermal imagers of the type mentioned above all include relatively sensitive receiving components which are vulnerable, at least to some degree, to differing levels of damage from exposure to strong light sources, such as lasers, directed into the field of view of the devices. With the proliferation of laser systems (such as range finders, infrared illuminators and the like), image detecting systems, image intensifiers, thermal imagers and electronic cameras of the type mentioned above require some type of protection against damage from such strong light sources.

Consequently, it is desirable to provide a safety protection system for a light sensitive electronic/optical system or thermal imager capable of intercepting impinging light energy which has an intensity in excess of a safe threshold to shut down or turn off the system to prevent damage to it.

SUMMARY OF THE INVENTION

Accordingly, it is an object of this invention to provide an improved safety shut-off protection system.

It is another object of this invention to provide an improved light sensitive safety shut-off protection system.

It is an additional object of this invention to provide a safety shut-off protection system for light sensitive optical systems to prevent damage of such systems from exposure to light exceeding a safe threhold intensity.

It is a futher object of this invention to provide an improved light responsive safety switch system to turn off the electrical control circuit in an optical system employing a sensing element responsive to light intensity when the light intensity exceeds a safe threshold.

In accordance with the preferred embodiment of the invention, a safety shut-off protection system for a light sensitive optical system with a sensing element in it includes an electrical control circuit connected with the sensing element of the optical system to activate and deactivate the sensing element. A normally closed light responsive safety switch device is connected in electrical series circuit with the electrical control circuit and is physically located to receive light directed toward the optical system to open the series circuit in response to light of a predetermined intensity impinging on the light responsive safety switch device.

DETAIL DESCRIPTION

Figure 1:
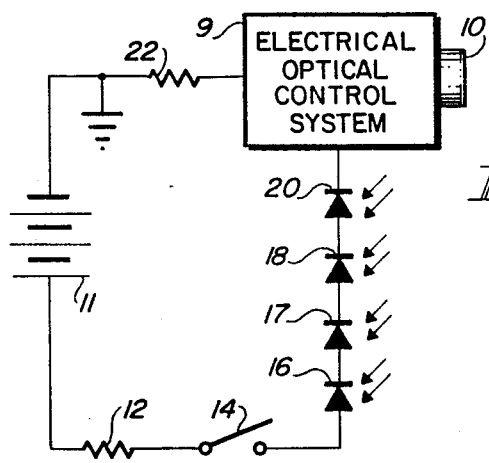
FIGS. 1 and 2 are circuit diagrams of circuit interconnections of various components of a preferred embodiments of the invention.

Reference now should be made to the drawings in which in the same reference numbers are used throughout the different figures to designate the same or similar components. FIG. 1 illustrates the circuit interconnections of a preferred embodiment of the invention with an electrical optical control system 9. The control system 9 may be of any one of a variety of different types of systems, such as image intensifiers, electronic camera aperture control systems, thermal imagers, or infrared image detectors. Such an optical control system 9 typically includes a lens 10 which is responsive to the light (visible or infrared) of the image to which the system 9 responds. The electrical optical system 9 is powered from a suitable source, such as a battery 11, which is connected in series with the system 9 through a current limiting resistor 12 and a typical on/off switch 14. The switch 14 is used to activate or deactivate the operation of the system 9. Another current limiting resistor 22 is connected between the system 9 and the negative terminal of the battery 11, as shown in FIG. 1. This much of the circuit of FIG. 1 constitutes the normal operating circuit for systems of the type described above.

In addition to the standard circuit, however, FIG. 1 illustrates four (4) photoelectric Darlington switches 16, 17, 18, and 20, connected in series between the switch 12 and the electrical optical control system 9. Normally, the series connected Darlington switches 16, 17, 18, and 20 are closed; so that the circuit of FIG. 1 operates in a conventional manner. When light of sufficient intensity, however, impinges upon any one of these diodes, the Darlington switch controlled by the diode 16, 17, 18, or 20 opens, thereby breaking the power circuit between the battery 11 and the system 9. The threshold of the light intensity which is required to do this is selected by the trigger level of the Darlington switch for the particular diode 16, 17, 18, or 20. These diodes may be responsive to light of the same wavelength and same intensity (that is, have the same threshold trigger level), or different ones of the diodes 16, 17, 18, or 20, may respond to light of different wavelengths (infrared or visible), or of different intensities. The operation of the circuit is the same, however, so that whenever any one of the diodes 16, 17, 18, or 20 has light of sufficient intensity to exceed its threshold or trigger level, that diode opens to break the circuit and to terminate the supply of power to the system 9.

Figure 2:
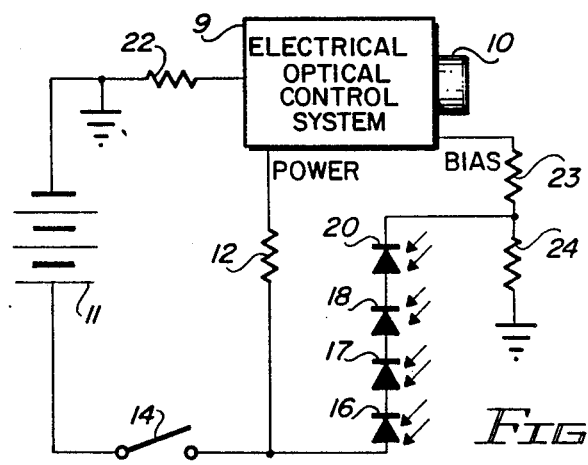

FIG. 2 is a variation of the circuit shown in FIG. 1. In FIG. 2, the photoelectric Darlington switch diodes 16, 17, 18, and 20 are connected in the bias circuit for the operating components of the electrical optical control system 9, instead of FIG. 2 which correspond to the ones of FIG. 1 are provided with the same reference numbers. As is apparent from FIG. 2, the power supply for the system 9 is supplied through the switch 14 and the current limiting resistor 12 directly. As a consequence, so long as the switch 14 is closed, power is supplied to the system 9. When the switch 14 is closed, a bias voltage also is supplied to the control system 9 through the Darlington switches 16, 17, 18, and 20, to the junction between a pair of bias resistors 23 and 24 connected between the system 9 and ground. So long as all of the photoelectric Darlington switches 16, 17, 18, and 20 are closed, a positive bias is applied through the resistor 23 to the system 9. Whenever light of sufficient intensity, however, impinges on any one of the diodes 16, 17, 18, and 20, the corresponding switch controlled by that diode opens in the same manner as described above in FIG. 1. When this occurs, ground potential is applied to the bias input of the control system 9. This then changes the bias voltage of the active light sensitive component of the system 9 to turn it off thereby preventing any possible damage to it. For example, the bias voltage which is applied from the resistor 23 may be connected to the control gate of a multiplexer in a video camera or to the bias voltage of a photocathode of an image intensifier to prevent operation of such components when light exceeding a predetermined safe threshold is directed toward the lens of the control system 9. Since the circuits to which such bias voltages are applied are standard well-known circuits, no details of these circuits of the system 9 have been shown in FIG. 2.

Figure 4:
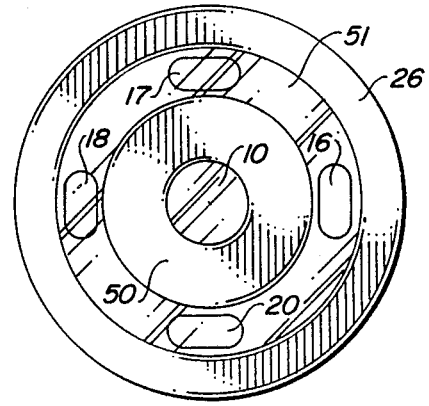
FIG. 4 is a top view of the embodiment shown in FIG. 3.
Figure 3:
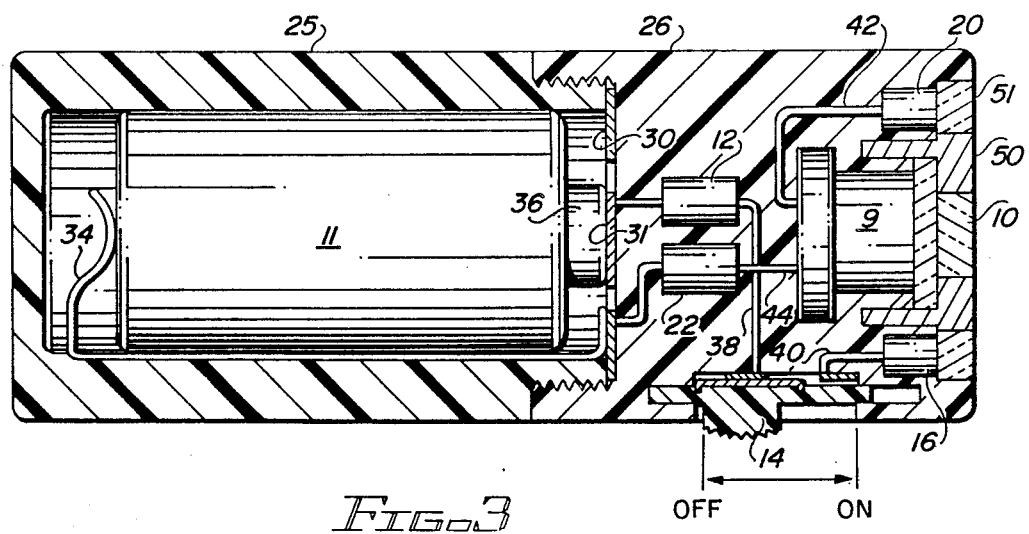
FIG. 3 is a cross-sectional view of the preferred embodiment of the invention shown in FIG. 1.

Reference now should be made to FIGS. 3 and 4 which illustrate an embodiment of the invention such as may be used, for example, in an image intensifier or video camera. The actual arrangement of parts illustrated does not necessarily depict the location of such parts in a video camera or image intensifier, but simply illustrates the relative physical arrangements, along with the electrical interconnections of the preferred embodiment of the invention. The embodiment of FIGS. 3 and 4 incorporates the circuitry of FIG. 1 in it, and those components of FIG. 3 which are the same as FIG. 1 are provided with the same reference numbers.

As illustrated, a two piece cylindrical housing is provided with a left-hand end 25 and a right-hand end 26 for housing the battery power supply 11 and the remainder of the control system 9, along with the other components of FIG. 1. The two portions 25 and 26 are threaded together to form a single composite cylinder, as illustrated, when the device is assembled.

The right-hand end 26 may be removed from the left-hand end 25 to permit the insertion of a suitable battery 11 into the hollow interior cavity of the portion 25. When the end 26 then is threaded onto the portion 25, the battery 11 is pressed into engagement on the negative terminal against a spring conductor 34, the right-hand end of which engages a conductive ring 30 on the end of the portion 26 which faces the cavity in which the battery 11 is placed. The center of this same end of the portion 26 has a conductive plate 31 on it to engage the positive terminal 36 of the battery 11. Thus, electrical connections are established between the battery 11 and the electrical circuity which is housed in or potted in the right-hand housing portion 26.

When the device is assembled, as shown in FIG. 3, an electrical connection is made between the positive terminal 36 of the battery through the plate 31 to the resistor 12. The other end of the resistor 12 is connected to one side of the on/off switch 14, which is illustrated as a simple slide switch. The switch 14 is shown in the "off" position in FIG. 3. When the switch 14 is moved to the right-hand position, indicated in the direction of the "on" arrow, contact is made through a lead 40 to the first of the photoelectric Darlington switches 16.

As mentioned in conjunction with FIG. 1, the photoelectric Darlington switches 16, 17, 18, and 20 are connected in series circuit with one another, and they are physically located at 90° intervals around the center of the lens 10, as shown most clearly in FIG. 4. To provide protection for the photoelectric Darlington switches 16, 17, 18, and 20, they are mounted behind a transparent ring 51, as shown in both FIGS. 3 and 4. The last of the switches 20 is connected through a lead 42 to the input of the electrical optical control system 9, as shown in FIG. 3. Return current from the system 9 is provided through a lead 44 to the resistor 22 which is electrically connected with the ring 30 to provide the return path through the spring 34 to the negative terminal of the battery 11. To prevent any reflection or transfer of light between the lens 10 and the switches 16, 17, 18, and 20, located behind the ring 51, an opaque guard ring 50 is placed between the lens 10 and the photoelectric Darlington switches behind the ring 51. All of these elements are cemented together or otherwise encased within the right-hand portion 26 of the cylindrical housing illustrated in FIGS. 3 and 4.

The photoelectric Darlington switches 16, 17, 18, and 20 are selected from suitable commerically available silicon detectors, and they are configured to be responsive to the wavelengths of light to be detected. Each of the switches is set to be triggered in accordance with a pre-established light threshold and the wavelength of the response of each of the switches may be the same or different, as described above.

If one or more of the photoelectric Darlington switches 16, 17, 18, or 20 is to be responsive to light having a wavelength in the infrared region (up to 1.5 microns) the photo responsive portion of the corresponding Darlington switch preferably is Indium Antimonide (InSb) or some other suitable silicon or Gallium compound. For infrared light in the mid infrared range (having a wavelength up to 5 microns), Indium Antimonide detectors or detectors made of a lead salt or doped silicon may be used. For far infrared wavelengths (up to 12 microns and beyond), Extrinsic Silicon or Mercury Cadmium Telluride compounds are preferred. For light in the visible range, other compounds are used in accordance with the desired response characteristics for the intended operation of the device. All of the photo responsive compounds mentioned above, as well as others, presently exist; so that the selection of the particular one for use as the photo responsive portion of the Darlington switches 16, 17, 18, or 20, depends upon the wavelength of the light from which the optical system 9 is to be protected.

Whenever the device of FIGS. 3 or 4, or a comparable device in another configuration, is pointed toward a scene for scanning that scene or repsonding to it, the photoelectric Darlington diode switches 16, 17, 18, and 20, also are directed toward that same scene. If light of a wavelength and intensity which would cause erroneous or improper operation of the electrical optical control system 9 or which might damage the system 9 to any extent is either intentionally or accidentially directed toward the lens 10, this same light is detected by one or more of the photoelectric Darlington diode switches 16, 17, 18, or 20. If the light correpsonds in wavelength and the intensity exceeds the preset threshold of the diode switch or switches, the corresponding Darlington diode switch is triggered to open the operating circuit to the optical control system 9. Effectively, this turns off the circuit for the duration for the time that the Darlington diode switch 16, 17, 18, or 20 is operated and serves to shut down the system in order to avoid any subsequent damage.

The switches 16, 17, 18, and 20 are illustrated in a simple format in FIG. 1. It should be noted, however, that the sensing element may be separate from the actual switching element and may constitute either direct coupled or optically coupled devices, if desired. The functional operation, however, irrespective of the particular electrical configuration used, is as described above. Whenever light of a wavelength in the response range of the photoelectric Darlington diode switch and of an intensity in excess of the safety threshold pre-established for that switch, impinges upon the switch, the operating circuit for the electrical optical control system 9 is interrupted or opened. This condition may remain until the entire system is manually reset, if desired. The system operation also automatically may resume as soon as the potentially damaging light is removed. The particular manner in which return to normal operation is effected is dependent upon the desired operating characteristics of the system with which the safety control circuit and apparatus is employed.

The amount of light which is required to operate the safety shut off protection system shown in the drawings is selected, as described above, by the trigger level of the Darlington switch, the light transmission properties of the ring 51, and the intensity of the light which impinges upon the selected one of the devices 16, 17, 18, or 20. These varying parameters may be calculated to cause the operation of the safety shut-off switch whenever a potentially damaging light intensity is directed toward the lens 10 of the system. It is readily apparent that for light which is below the trigger threshold of the Darlington switch devices 16, 17, 18, and 20, the switches remain closed; and the control system 9 operates in its normal manner.

The device which is shown and which has been described above effectively operates to turn off the operating power to the electrical optical control system before any permanent damage can occur to it, as a result of accidental or intentional high intensity light directed toward the system. The foregoing description of the preferred embodiment of the invention is to be taken as illustrative only, and not as limiting. Various changes and modifications will occur to those skilled in the art without departing from the true scope of the invention as defined in the appended claims.

I claim:

1. A safety shut-off protection system for a light sensitive system having a sensing element therein, said protection system including in combination:
    electrical control circuit means coupled with said sensing element of said light sensitive system for activating and deactivating said sensing element; and
    light responsive safety switch means having a light receiving portion concentrically mounted with respect to said light sensitive system and connected in electrical circuit with said electrical control circuit means and including means physically located to receive light directed toward said light sensitive system for deactivating said sensing element in response to light of a predetermined intensity impinging thereon.

2. The combination according to claim 1 wherein light responsive safety switch means comprises photoelectric Darlington switch means.

3. The combination according to claim 2 wherein said light responsive safety switch means further is responsive to light having a predetermined wavelength.

4. The combination according to claim 3 wherein said predetermined wavelength comprises visible light.

5. The combination according to claim 3 wherein said predetermined wavelength comprises infrared light.

6. The combination according to claim 5 wherein said light sensitive system is an optical system, and further including a housing for said optical system, said electrical control circuit means and said light responsive safety switch means, with said optical system and said light responsive safety switch means mounted to simultaneously receive light from the same direction impinging thereon.

7. The combination according to claim 6 wherein said housing is a substantially cylindrical housing with said optical system being mounted in a circular opening therein substantially in the center of one end thereof.

8. The combination according to claim 7 wherein said light responsive safety switch means comprises a plurality of safety switch means substantially concentrically disposed about said optical system with said plurality of safety switch means being interconnected in series circuit with one another.

9. The combination according to claim 8 wherein different ones of said plurality of safety switch means are responsive to light of different wavelengths.

10. The combination according to claim 9 further including a power supply in said housing.

11. The combination according to claim 10 wherein said power supply is a battery power supply.

12. The combination according to claim 1 wherein said light sensitive system is an optical system, and further including a housing for said optical system, said electrical control circuit means and said light responsive safety switch means, with said optical system and said light responsive safety switch means mounted to simultaneously receive light from the same direction impinging thereon.

13. The combination according to claim 12 wherein the light receiving portion of said light responsive safety switch means is concentrically mounted with respect to said optical system.

14. The combination according to claim 13 wherein said light responsive safety switch means comprises a plurality of safety switch means substantially concentrically disposed about said optical system with said plurality of safety switch means being interconnected in series circuit with one another.

15. The combination according to claim 14 wherein different ones of said plurality of safety switch means are responsive to light of different wavelengths.

16. The combination according to claim 1 wherein said light responsive safety switch means further is responsive to light having a predetermined wavelength.

17. A safety shut-off protection system including in combination:
    a housing having a light receiving opening therein;
    an electronic device mounted in said housing;
    a power supply mounted in said housing and connected to said electronic device; and
    a plurality of light responsive safety switch means located in different positions about said light receiving opening in said housing to receive light impinging thereon and being interconnected in series circuit with one another and connected in electrical circuit with said electronic device and said power supply for disabling said electronic device in response to light of a predetermined intensity impinging thereon.

18. The combination according to claim 17 wherein said light responsive safety switch means further is responsive to light having a predetermined wavelength.

19. The combination according to claim 18 wherein said predetermined wavelength comprises visible light.

20. The combination according to claim 18 wherein said predetermined wavelength comprises infrared light.

21. The combination according to claim 17 wherein different ones of said plurality of safety switch means are responsive to light of different wavelengths.

22. The combination according to claim 17 wherein light responsive safety switch means comprises photoelectric Darlington switch means.

* * * * *